(12) United States Patent
Hwang

(10) Patent No.: US 9,632,220 B2
(45) Date of Patent: Apr. 25, 2017

(54) DECAL FOR MANUFACTURING MULTI-COLORED RETROREFLECTIVE STICKER

(71) Applicant: MS Korea Co., Ltd., Gwangju-si (KR)

(72) Inventor: Kun Lee Hwang, Gwangju-si (KR)

(73) Assignee: MS KOREA CO., LTD., Gyeonggi-Do (KR)

( * ) Notice: Subject to any disclaimer, the term of this patent is extended or adjusted under 35 U.S.C. 154(b) by 213 days.

(21) Appl. No.: 14/696,629

(22) Filed: Apr. 27, 2015

(65) Prior Publication Data

US 2016/0097886 A1  Apr. 7, 2016

(30) Foreign Application Priority Data

Oct. 6, 2014 (KR) .................. 10-2014-0134192

(51) Int. Cl.
| | |
|---|---|
| *G02B 5/128* | (2006.01) |
| *B44F 1/04* | (2006.01) |
| *G09F 13/16* | (2006.01) |
| *G09F 3/10* | (2006.01) |
| *G09F 3/02* | (2006.01) |

(52) U.S. Cl.
CPC .............. *G02B 5/128* (2013.01); *B44F 1/045* (2013.01); *G09F 3/02* (2013.01); *G09F 3/10* (2013.01); *G09F 13/16* (2013.01)

(58) Field of Classification Search
CPC ......... G02C 11/00; G02C 11/10; G09F 13/16; G09F 3/02; G09F 3/10; G02B 5/128; B44F 1/045

USPC ........... 359/483.01, 484.04, 485.01–485.07, 359/486.01, 540; 351/47, 51, 52; 283/67, 45, 46; 156/277, 268, 270, 289
See application file for complete search history.

(56) References Cited

U.S. PATENT DOCUMENTS 6,548,164 B1 * 4/2003 Bacon, Jr. .............. C09J 7/0246
359/529

FOREIGN PATENT DOCUMENTS

KR  1020020013922  2/2002

* cited by examiner

*Primary Examiner* — Bumsuk Won
*Assistant Examiner* — Wen Huang
(74) *Attorney, Agent, or Firm* — Cantor Colburn LLP

(57) ABSTRACT

A decal for manufacturing a multi-colored retroreflective sticker having a variety of colorful letters or patterns includes: a glass bead layer including a printing layer having the colorful letters or patterns made of dye-based ink, on one side of the glass bead layer; a transparent reflective layer formed on the other side of the glass bead layer and having a polarization element and a diffused reflection element sequentially deposited; an opaque bonding layer including a mixture of polyurethane and a white pigment and applied on the reflective layer to hold the glass bead layer; a thermal adhesive layer applied on the bonding layer; and a carrier sheet removably attached on the thermal adhesive layer by an adhesive remover layer, thereby obtaining uniform luminance under an artificial light source and high brightness and saturation under a natural light source.

3 Claims, 2 Drawing Sheets

DECAL FOR MANUFACTURING MULTI-COLORED RETROREFLECTIVE STICKER

BACKGROUND OF THE INVENTION

1. Field of the Invention

The present invention relates to a decal for manufacturing a multi-colored retroreflective sticker having a variety of colorful letters or patterns and, more particularly, to a decal for manufacturing a multi-colored retroreflective sticker, which has high brightness and saturation under natural light.

2. Description of the Related Art

A variety of colored retroreflective decals have been developed to date and are utilized for the manufacture of bands or stickers that are attached to various personal items such as clothes, shoes, bags, etc. As such, these bands or stickers may exhibit retroreflective characteristics upon artificial light irradiation, especially upon irradiation with an artificial light source such as a lighting lamp or headlamp, thus increasing the ability of a person to discriminate objects with such bands or stickers at nighttime, thereby preventing traffic accidents or safety accidents. Further, these bands or stickers have been used for advertisements, brands and labels of corresponding items, or decorative effects thereof. The colored retroreflective decals are provided in diverse forms configured such that a sheet having a reflective layer formed mainly of a metal such as aluminum or silver by a deposition process is subjected to a predetermined cutting process to give final products such as bands or stickers having letters or patterns. These products are attached to personal items to thus manifest retroreflective characteristics upon irradiation with an artificial light ray. As such, final products, for example, colored retroreflective bands or stickers, are researched for only luminance thereof with reflection to a silvery white color by an artificial light source, without taking into consideration the color appearance under natural light.

Although the colored retroreflective decals have high luminance upon irradiation with an artificial light source, brightness of colorful letters or patterns of bands or stickers as final products using the decals may decrease under natural light, undesirably deteriorating color appearance.

More specifically, the decal for a colored retroreflective band or sticker as a final product is configured such that a color layer, a reflective layer, and a bonding layer, and optionally, a non-thermal or thermal adhesive layer, as necessary, are sequentially formed on the rear side of a glass bead layer. As such, the color layer shows the background color of the decal.

The reflective layer provided on the color layer that shows the background color of the decal is made of a metal that shows dark grey having low brightness, such as aluminum or silver, so that brightness of the color layer may decrease, undesirably deteriorating color appearance.

Therefore, the colored retroreflective decals manifest poor color appearance under natural light, thus lowering the quality of products. Furthermore, when the bands or stickers manufactured using such decals having poor color appearance are attached to personal items, the decorative effect and quality of the items may also decrease.

Also, the color layer, which is provided on the rear side of the glass bead layer of the colored retroreflective decal, has a single color to thus show the background color of the sheet for a decal, and also merely functions to give a colored decal under natural light.

Since the color layer is provided on the rear side of the glass bead layer in the reflective structure, saturation of the color layer may also decrease under natural light.

Recently, development of decals for manufacturing multi-colored stickers having relatively high brightness under a natural light source is required. Specifically, there is a need for decals configured to include a multi-colored printing layer having a variety of colorful letters or patterns on the glass bead layer, and to achieve complementary color contrast that increases brightness of the multi-colored printing layer by the background color of the decal and simultaneously to ensure high-quality products by increasing saturation thereof.

CITATION LIST

Patent Literature (Patent Document 1) Korean Patent Application Publication No. 2002-13922

SUMMARY OF THE INVENTION

Accordingly, the present invention has been made keeping in mind the above problems encountered in the related art, and an object of the present invention is to provide a decal for manufacturing a multi-colored retroreflective sticker, which may properly maintain luminance under an artificial light source and may exhibit high brightness and saturation of a multi-colored printing layer under a natural light source.

Another object of the present invention is to provide a decal for manufacturing a multi-colored retroreflective sticker, wherein high brightness of a multi-colored printing layer is ensured by forming a colorless and transparent reflective layer and showing complementary color contrast of the multi-colored printing layer by the background color of the decal, thereby solving conventional problems with low brightness due to an opaque reflective layer made of a dark grey-colored metal.

Still another object of the present invention is to provide a decal for manufacturing a multi-colored retroreflective sticker, wherein a multi-colored printing layer may be freely printed on a glass bead layer, so that a variety of colorful letters or patterns are manifested, and saturation of the printing layer is increased, and furthermore, quality of items may be further increased when such stickers are attached to the items.

In order to accomplish the above objects, the present invention provides a decal for manufacturing a multi-colored retroreflective sticker having a variety of colorful letters or patterns, comprising: a glass bead layer including a printing layer having the colorful letters or patterns made of dye-based ink, the printing layer being applied on one side of the glass bead layer; a transparent reflective layer formed on the other side of the glass bead layer and having a polarization element and a diffused reflection element sequentially stacked by a deposition process; an opaque bonding layer comprising a mixture of polyurethane and a white pigment and applied on the reflective layer to hold the glass bead layer; a thermal adhesive layer applied on the bonding layer; and a carrier sheet including an adhesive remover layer that enables the carrier sheet to be removably attached on the thermal adhesive layer, thereby obtaining uniform luminance under an artificial light source and high brightness and saturation under a natural light source.

According to the present invention, a decal for manufacturing a multi-colored retroreflective sticker is configured such that a multi-colored printing layer having a variety of patterns is provided on one side of a glass bead layer, and the background color of the decal is set to white so as to show complementary color contrast with respect to the multi-colored printing layer, thereby maintaining the patterns of the multi-colored printing layer and luminance under artificial light. In particular, saturation and brightness of the multi-colored printing layer of the sticker can be increased under natural light, thus improving the quality of products.

Also, the multi-colored retroreflective sticker having high brightness and saturation can increase the decorative effects of items, and also can maximize publicity effects thereof such as advertisements.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Figure 1:
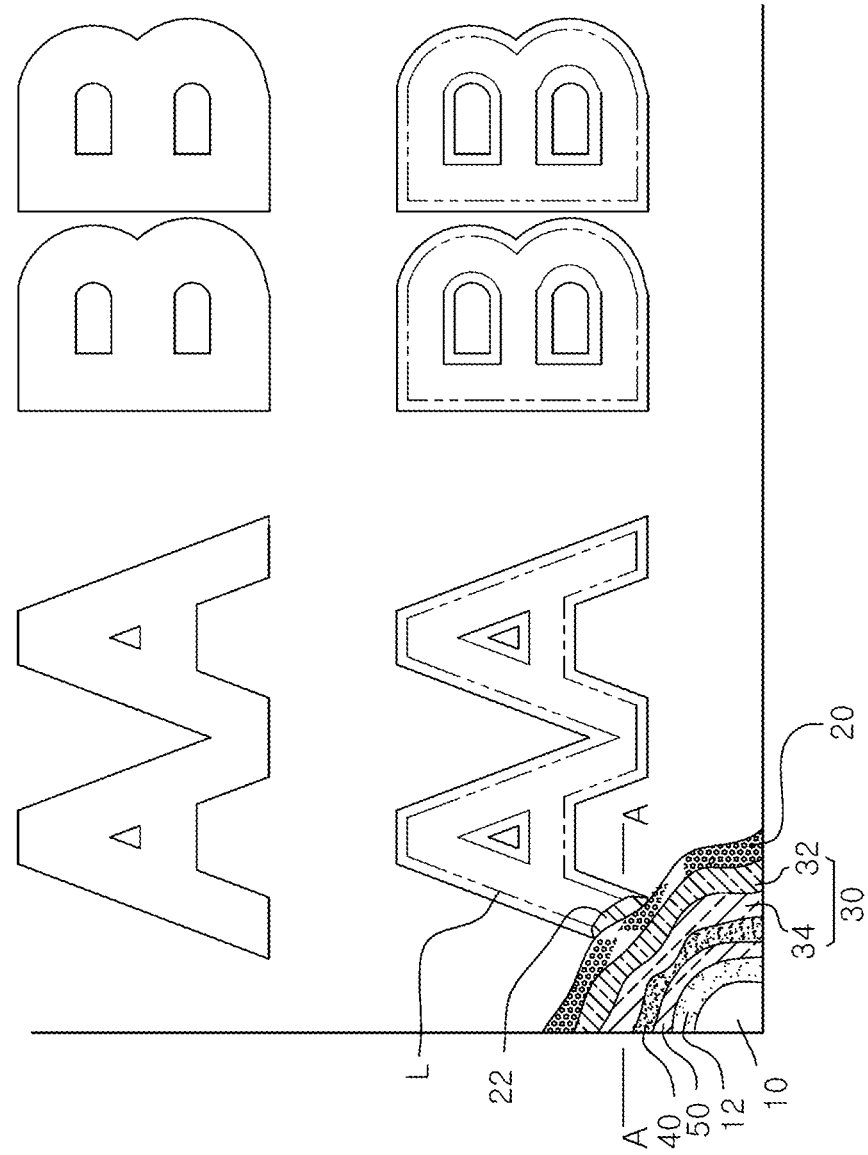
FIG. 1 is a partial cutaway top plan view illustrating a decal for manufacturing a multi-colored retroreflective sticker according to the present invention.
Figure 2:
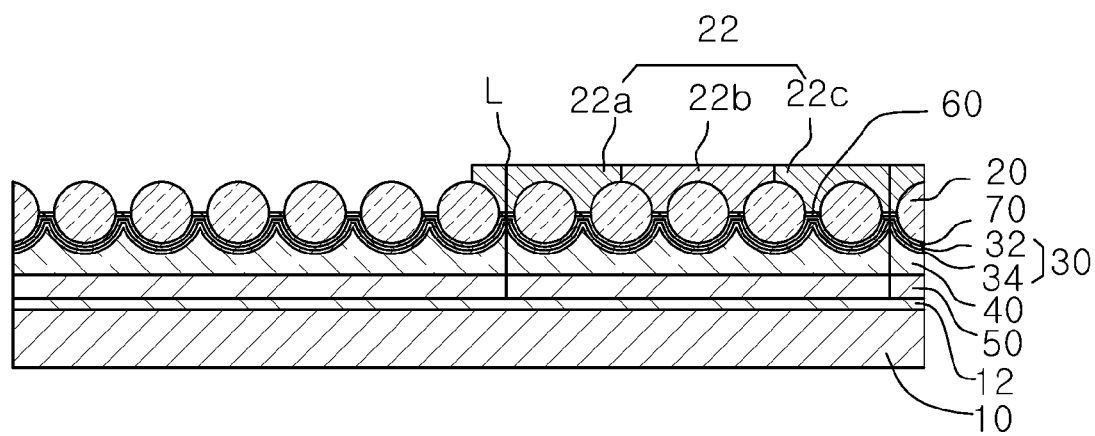
FIG. 2 is a cross-sectional view taken along the line A-A of FIG. 1, illustrating a layered structure of the decal according to the present invention.

Hereinafter, a detailed description will be given of embodiments of the present invention with reference to the appended drawings. FIGS. 1 and 2 illustrate a decal for manufacturing a multi-colored retroreflective sticker according to the present invention.

According to the present invention, the decal is used to manufacture a multi-colored retroreflective sticker having a variety of colorful letters or patterns. In particular, the present invention is characterized to provide a multi-colored retroreflective sticker having high brightness and saturation under natural light while maintaining appropriate luminance under an artificial light source.

The decal according to the present invention includes a carrier sheet 10 for storage and transport thereof, and a retroreflective structure layer comprising a glass bead layer 20 and a reflective layer 30.

On the front side of the glass bead layer 20, a transparent printing layer 22 having colorful letters or patterns made of dye-based ink is provided using a spraying process. The printing layer 22 includes a first color 22a, a second color 22b, and a third color 22c, each of which has at least 1°.

On the rear side of the glass bead layer 20, a colorless and transparent reflective layer 30 is deposited in the form of a thin film. The reflective layer 30 includes a polarization element 32 and a diffused reflection element 34.

The polarization element 32 of the reflective layer 30 plays a role in preventing diffused reflection of light reflected from the diffused reflection element 34 on the rear side of the glass bead layer 20, and also in reducing loss of light upon passing through the glass bead layer 20 and enabling light to travel horizontally. The polarization element 32 is preferably made of a birefringent material, for example, cryolite, beryllium, magnesium fluoride, or halite.

The diffused reflection element 34 of the reflective layer 30 is preferably made of a fluorescent material, for example, rhodium, platinum, barium fluoride, zinc sulfide, tantalum, zinc, silicon nitride, or silicon carbide, having high visual color effects and high-efficiency stable emission properties.

The polarization element 32 and the diffused reflection element 34 of the reflective layer 30 are sequentially stacked on the rear side of the glass bead layer 20 using a vacuum deposition process.

Also, an opaque bonding layer 40 is applied on the reflective layer 30. The opaque bonding layer 40 comprises polyurethane and a white pigment mixed at an appropriate ratio, thus imparting stable bondability of the glass bead layer 20 formed on the front side of the decal and providing conditions suitable for complementary color contrast of the printing layer 22.

Provided on the bonding layer 40 is a thermal adhesive layer 50 to adhere a sticker manufactured by cutting the decal to the corresponding item using a heat-sealing process.

Also, the carrier sheet 10 is removably attached on the thermal adhesive layer 50 by means of an adhesive remover layer 12.

The decal according to the present invention has a complementary color contrast structure to further increase brightness of the printing layer 22.

The complementary color contrast structure has a first complementary color contrast layer 60 and a second complementary color contrast layer 70 on the glass bead layer 20.

The first complementary color contrast layer 60 is composed of an opaque white pigment, which has relatively low viscosity and is loaded in the gaps between the beads of the glass bead layer 20 to provide first complementary color contrast of the printing layer 22.

The second complementary color contrast layer 70 is composed of a transparent white dye, which has relatively high viscosity and is applied on the rear side of the glass bead layer 20 to provide complementary color contrast of the printing layer 22 together with the first complementary color contrast layer 60.

The decal thus configured shows a white background color by means of the first and the second complementary color contrast layer 60, 70, thus obtaining the complementary color contrast effect of the printing layer having various colors, thereby increasing both brightness and saturation of a multi-colored retroreflective sticker manufactured from the decal of the invention.

Figure 3:
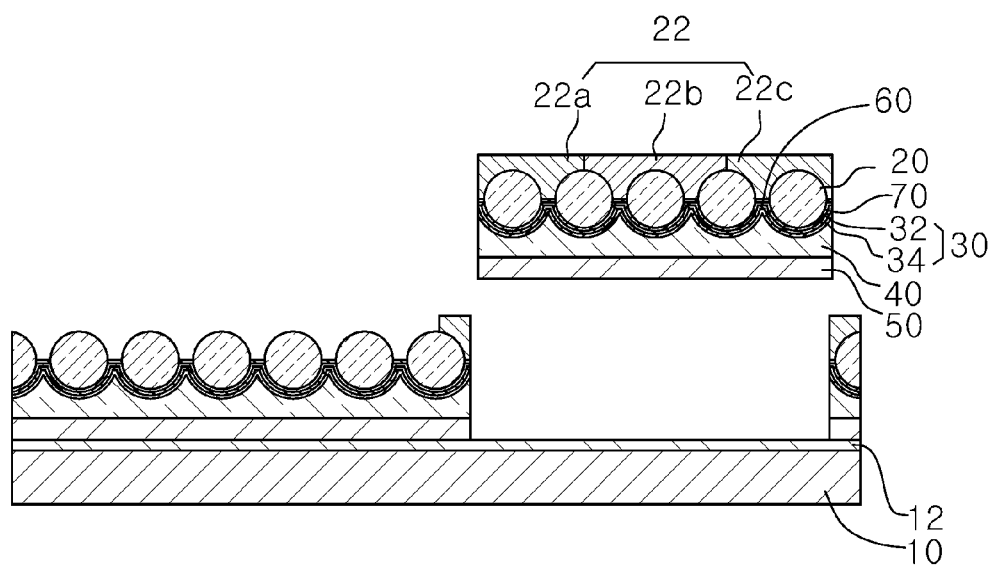
FIG. 3 illustrates a process of cutting and separating a multi-colored retroreflective sticker from the sheet for the decal according to the present invention.

FIG. 3 illustrates a process of manufacturing the multi-colored retroreflective sticker using the decal according to the present invention. Specifically, the decal according to the present invention is cut in a cutting line L along the edge of the printing layer 22 using a predetermined pressing process. The cutting line L has a depth ranging from the glass bead layer 20 to before the adhesive remover layer 12 of the carrier sheet 10.

After completion of the cutting process, the inside defined by the cutting line L is removed from the adhesive remover layer 12 of the carrier sheet 10, resulting in a multi-colored retroreflective sticker.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A decal for manufacturing a multi-colored retroreflective sticker having a variety of colorful letters or patterns, comprising:
   a glass bead layer including a printing layer having the colorful letters or patterns made of dye-based ink, the printing layer being applied on one side of the glass bead layer;
   a transparent reflective layer formed on the other side of the glass bead layer and having a polarization element and a diffused reflection element sequentially stacked by a deposition process;
   an opaque bonding layer comprising a mixture of polyurethane and a white pigment and applied on the transparent reflective layer to hold the glass bead layer;
   a thermal adhesive layer applied on the bonding layer; and
   a carrier sheet including an adhesive remover layer that enables the carrier sheet to be removably attached on the thermal adhesive layer.

2. The decal of claim 1, further comprising an opaque first complementary color contrast layer loaded in gaps between beads of the glass bead layer using a white pigment to provide a background color of the printing layer.

3. The decal of claim 1, further comprising a transparent second complementary color contrast layer applied on the other side of the glass bead layer using a white dye to provide a background color of the printing layer together with the first complementary color contrast layer.

* * * * *